(12) United States Patent
He et al.

(10) Patent No.: US 11,662,803 B2
(45) Date of Patent: May 30, 2023

(54) CONTROL METHOD, APPARATUS, AND ELECTRONIC DEVICE

(71) Applicant: Lenovo (Beijing) Limited, Beijing (CN)

(72) Inventors: Gang He, Beijing (CN); Yuhao Kuang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/390,813

(22) Filed: Jul. 30, 2021

(65) Prior Publication Data
US 2022/0035438 A1    Feb. 3, 2022

(30) Foreign Application Priority Data

Jul. 31, 2020 (CN) .......................... 202010763562.7

(51) Int. Cl.
*G06F 1/00* (2006.01)
*G06F 1/3296* (2019.01)
*G06F 1/3228* (2019.01)

(52) U.S. Cl.
CPC .......... *G06F 1/3296* (2013.01); *G06F 1/3228* (2013.01)

(58) Field of Classification Search
CPC .............................. G06F 1/3296; G06F 1/3228
See application file for complete search history.

(56) References Cited

U.S. PATENT DOCUMENTS

| 10,785,124 | B2 * | 9/2020 | Ahuja | ...................... H04L 45/38 |
| 2004/0110512 | A1 * | 6/2004 | Lim | ...................... H04W 88/08 |
| | | | | 455/450 |
| 2009/0245102 | A1 * | 10/2009 | Feng | ...................... H04L 67/141 |
| | | | | 370/228 |
| 2010/0215012 | A1 * | 8/2010 | Cho | ...................... H04W 36/06 |
| | | | | 370/329 |
| 2014/0223214 | A1 * | 8/2014 | Nabhane | ............. G06F 11/3093 |
| | | | | 713/340 |
| 2015/0035367 | A1 * | 2/2015 | Fang | ...................... H02J 9/061 |
| | | | | 307/64 |
| 2017/0156115 | A1 * | 6/2017 | Yang | ................. H04W 52/0254 |
| 2019/0052355 | A1 * | 2/2019 | Chiang | .............. H04Q 11/0062 |
| 2020/0117242 | A1 * | 4/2020 | Yamasaki | ............. G06F 1/1643 |
| 2021/0073106 | A1 * | 3/2021 | Géhberger | .......... G06F 11/0709 |

* cited by examiner

*Primary Examiner* — Mohammed H Rehman
(74) *Attorney, Agent, or Firm* — Anova Law Group, PLLC

(57) ABSTRACT

The present disclosure provides a control method. The method includes when an electronic device is in a first operating mode and has an abnormal situation, switching the electronic device to a second operating mode, to process the abnormal situation in the second operating mode; and when the electronic device has returned to normal, switching the electronic device to the first operating mode. Power consumption and/or available system resource of the electronic device in the first operating mode are less than power consumption and/or available system resource of the electronic device in the second operating mode.

15 Claims, 6 Drawing Sheets

CONTROL METHOD, APPARATUS, AND ELECTRONIC DEVICE

CROSS-REFERENCE TO RELATED APPLICATION

This application claim priority to Chinese Patent Application No. CN 202010763562.7, filed Jul. 31, 2020, the entire content of which is incorporated herein by reference.

TECHNICAL FIELD

The present disclosure relates to the technical field of computer and, more particularly, to a control method, apparatus, and electronic device.

BACKGROUND

With introduction of the concept of low-carbon environmental protection, the issue of low power consumption of an electronic device has become a common concern in industry. In related technologies, the electronic device in a low power consumption state often has application or network connection in abnormal states, which easily causes the electronic device in the low power consumption state to fail to properly operate.

SUMMARY

One aspect of the present disclosure provides a control method. The method includes when an electronic device is in a first operating mode and having an abnormal situation, switching the electronic device to a second operating mode, to process the abnormal situation in the second operating mode; and when the electronic device has returned to normal, switching the electronic device to the first operating mode. Power consumption and/or available system resource of the electronic device in the first operating mode are less than power consumption and/or available system resource of the electronic device in the second operating mode.

Another aspect of the present disclosure provides a control device. The control device includes a first switching module configured to, when an electronic device is in a first operating mode and has an abnormal situation, switch the electronic device to a second operating mode, to process the abnormal situation in the second operating mode; and a second switching module configured to, when the electronic device has returned to normal, switch the electronic device back to the first operating mode. Power consumption and/or available system resource of the electronic device in the first operating mode are less than power consumption and/or available system resource of the electronic device in the second operating mode.

Another aspect of the present disclosure provides an electronic device. The electronic device includes a memory and a processor configured to execute a program of a control method stored in the memory to implement a method, including when the electronic device is in a first operating mode and has an abnormal situation, switching the electronic device to a second operating mode, to process the abnormal situation in the second operating mode; and when the electronic device has returned to normal, switching the electronic device back to the first operating mode. Power consumption and/or available system resource of the electronic device in the first operating mode are less than power consumption and/or available system resource of the electronic device in the second operating mode. A communication bus configured to implement a communication connection between the processor and the memory.

DETAILED DESCRIPTION OF THE EMBODIMENTS

The technical solutions in the embodiments of the present disclosure will be clearly described in detail below in conjunction with the accompanying drawings in the embodiments of the present disclosure.

It should be understood that "the embodiments of the present disclosure" or "the foregoing embodiments" described throughout the specification refers to that specific features, structures, or characteristics related to the embodiments are included in at least one embodiment of the present disclosure. Therefore, the appearance of "in the embodiments of the present disclosure" or "in the foregoing embodiments" in various places throughout the specification does not necessarily refer to the same embodiment. In addition, these specific features, structures, or characteristics can be combined in one or more embodiments in any suitable manner. In the various embodiments of the present disclosure, size of sequence number of the processes described above does not mean execution order, and the execution order of each process should be determined by its function and internal logic, which should not constitute any limitation to the implementation process of the embodiments of the present disclosure. Sequence numbers of the foregoing embodiments of the present disclosure are only for description, and do not represent superiority or inferiority of the embodiments.

Unless otherwise specified, an electronic device executes any process in the embodiments of the present disclosure, and a processor of the electronic device may execute the process. It should also be noted that the embodiments of the present disclosure do not limit the sequence in which the electronic device executes the following processes. In addition, methods used to process data in different embodiments may be the same method or different methods. It should also be noted that any process in the embodiments of the present disclosure can be independently executed by the electronic device, that is, when the electronic device executes any process in the following embodiments, it may not rely on the execution of other processes.

It should be understood that the specific embodiments described herein are only used to explain the present disclosure rather than limit the present disclosure.

Figure 1:
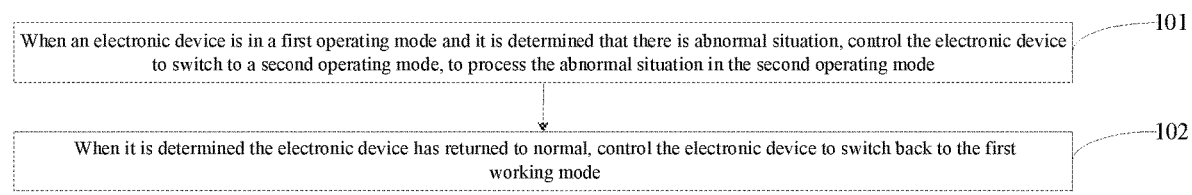
FIG. 1 is a schematic flow chart of a control method according to an embodiment of the present disclosure.

The embodiments of the present disclosure provide a control method, which is applied to an electronic device. As shown in FIG. 1, the method includes the following processes.

Process 101, when the electronic device is in a first operating mode and it is determined that there is an abnormal situation, controlling the electronic device to switch to a second operating mode, to process the abnormal situation in the second operating mode.

In the embodiments of the present disclosure, the electronic device can be any device with data processing capabilities. In one embodiment, the electronic device can be a device with, but not limited to, two different operating modes. The operating mode can be an operating mode in a broad sense, such as: a standby mode, a shutdown mode, a normal operating mode, a low power consumption mode, a high energy consumption mode, an office mode, an entertainment mode, or a mobile phone mode. The operating mode can also be different operating modes configured by the electronic device for different users, different operating systems, etc.

In one embodiment, the first operating mode is a low power consumption operating mode, and the second operating mode is a normal operating mode.

In another embodiment, the first operating mode is a modern standby (MS) mode. The MS mode is a type of PC sleep mode, and in the MS mode all internal components of a personal computer (PC) are in a low power consumption state. In such a low power consumption standby state, if the PC is to resume execution, the components of PC can quickly return to an operating state. The MS mode, also called MS state, provides users with the same power consumption control method on a computer as on a smart phone, which can realize user experience of "immediately turn on" and "immediately turn off". Further, when the PC is in the MS state, the PC will enter a sleep state of "S0 low power idle model". At this time, the PC is still connected to the Internet, and most application programs are in a paused state except for applications such as music playback, reminder, and notification. It is simply needed to press any key to log in to the computer and enter the working state, i.e., the second operating mode.

It should be noted that the PC has two situations in the MS state. One is a connected standby (CS) state, which refers to that the PC is still connected to the Internet when it sleeps, such as receiving emails. After the PC enters the CS state, emails can still be received in background, and new emails can be seen immediately after the PC is waked up. The other is a disconnected standby (DS) state, that is, network is disconnected when PC sleeps.

In some embodiments of the present disclosure, the abnormal situation may be the abnormal situation that exists when the electronic device is in the first operating mode, but is not limited to the following abnormal situations: hardware component abnormality, application abnormality, hardware component and application abnormality at the same time, and network connection abnormality. Application in the application abnormality can be application software or system software inside the electronic device.

It should be noted that determination of the abnormal situation may be obtained by internal detection of the electronic device, or it may be obtained by detection of specific application software.

In some embodiments of the present disclosure, the electronic device in the first operating mode and in the abnormal situation can be controlled to switch to the second operating mode through operating system (OS), a related application, or a related device, and meanwhile, the abnormal situation in the first operating mode of the electronic device is processed in the second operating mode.

In some embodiments of the present disclosure, processing the abnormal situation in the second operating mode may be diagnosing, repairing, or reporting the abnormal situation of the electronic device. Corresponding to the abnormal situations described above, for example, the application abnormality can be diagnosed and repaired, the hardware component abnormality can be reported to a relevant platform, the network abnormality can be repaired, etc.

Process 102, when it is determined that the electronic device has returned to normal, controlling the electronic device to switch back to the first operating mode.

Power consumption and/or available system resource of the electronic device in the first operating mode are less than power consumption and/or available system resource of the electronic device in the second operating mode.

In some embodiments of the present disclosure, when an application inside the electronic device that can run normally in the second operating mode monitors that the related abnormal situation returns to normal, the related application or related device controls the electronic device to switch back to the first operating mode.

It should be noted that the power consumption and/or the available system resource of the electronic device in any operating mode may be the power consumption and/or the available system resource of the electronic device itself within a predetermined period of time, where the system resource can be internal resource of the electronic device; or may be system network resource occupied by the electronic device in a network connection state.

In some embodiments of the present disclosure, system resource includes but is not limited to the following resources, such as: central processing unit (CPU), sound card, display, I/O interface, network card, and various internal drivers of the electronic device.

In one embodiment, the power consumption and the available system resource of the electronic device in the first operating mode are both less than the power consumption and the available system resource of the electronic device in the second operating mode.

In another embodiment, the power consumption of the electronic device in the first operating mode is less than the power consumption of the electronic device in the second operating mode.

In another embodiment, the available system resource of the electronic device in the first operating mode is less than the available system resource of the electronic device in the second operating mode.

In some embodiments of the present disclosure, the electronic device switches between the first operating mode and the second operating mode, which may be based on a specific condition, or may be automatically switched according to a preset strategy.

In the control method provided by the embodiments of the present disclosure, when the electronic device is in the first operating mode and it is determined that there is an abnormal situation, the electronic device is controlled to switch to the second operating mode, to process the abnormal situation in the second operating mode; when it is determined that the electronic device has returned to normal, the electronic device is controlled to switch back to the first operating mode. The power consumption and/or the available system resource of the electronic device in the first operating mode are less than the power consumption and/or the available system resource of the electronic device in the second operating mode. In this way, the first operating mode with the abnormal situation is switched to the second operating mode, the abnormal situation is processed in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Based on the embodiments described above, in one embodiment, the electronic device can implement process A1 when executing the process 101: when the electronic device is in the first operating mode and it is determined that the network connection is abnormal, controlling the electronic device to switch to the second operating mode, to repair the network connection in the second operating mode.

In some other embodiments of the present disclosure, whether the network connection is abnormal can be determined by number of heartbeat information received by the electronic device within a predetermined time. It can be determined that the network connection is abnormal if the number of the heartbeat information received within the predetermined time does not match a preset threshold. It can also be determined by detecting uplink data and downlink data flow conditions of the electronic device when connected to the network. If there is only uplink data but no downlink data, it indicates that the network connection of the electronic device is abnormal.

In some embodiments of the present disclosure, the electronic device can detect whether the network connection of the electronic device is abnormal through an application that can run normally in the first operating mode, and the electronic device can also send connection information to server through the application that can run normally in the first operating mode. The server and the electronic device communicate through the network, and when feedback information with regard to the connection information sent by the server is not received, it is determined that the network connection is abnormal. The electronic device can also repair the network through an application for repairing the network connection, and the application can run in the second operating mode.

In another embodiment, the electronic device can also implement process A2 when executing the process 101: when the electronic device is in the first operating mode and a first application running in the first operating mode is abnormal, controlling the electronic device to switch to the second operating mode, to process the first application in the second operating mode.

In some embodiments of the present disclosure, the first application may be an application program of any operating system. The operating system may be, but not limited to, Windows operating system, Linux operating system, Android operating system, etc., and specific Windows operating system may be, but not limited to, Windows 8 operating system, Windows 10 operating system, etc.

In one embodiment, the first application may be an application program in the Windows 10 operating system, specifically a Win 32 application program. The application program may be system software or application software. It should be noted that the Win 32 application program can be used in the Windows 10 operating system.

In some other embodiments of the present disclosure, the first application may be one or more applications running inside the electronic device, and the first application may specifically be, but not limited to, the following application programs, such as: drawing application program, word processing application program, email application program, game application program, website creation application program, web browsing application program, digital music player application program, digital video player application program, etc.

The first application is abnormal may refer to that the first application is abnormal in startup phase. For example, when number of consecutive restarts of the first application within a preset time is greater than a preset number of times, it is determined that the first application is abnormal. The first application is abnormal may also refer to that the first application is abnormal in running process. For example, when webpage drawing is stuck, click search does not respond, uploading or downloading data is stuck, etc., it is determined that the first application is abnormal.

In some embodiments of the present disclosure, processing the first application in the second operating mode may include diagnosing and repairing the first application, or reporting a problem and then re-downloading and updating the first application.

In another embodiment, the electronic device can also implement process A3 when executing the process 101: when the electronic device is in the first operating mode and it is determined that a target hardware component is abnormal, controlling the electronic device to switch to the second operating mode, to process the target hardware component in the second operating mode.

In some other embodiments of the present disclosure, the target hardware component is abnormal may refer to that usage data of the target hardware component is abnormal. In one embodiment, the target hardware component is abnormal may refer to that usage data of internal network card of the electronic device is abnormal, where the usage data of the network card is abnormal may refer to that the usage data of the network card is less than a preset threshold.

Figure 2:
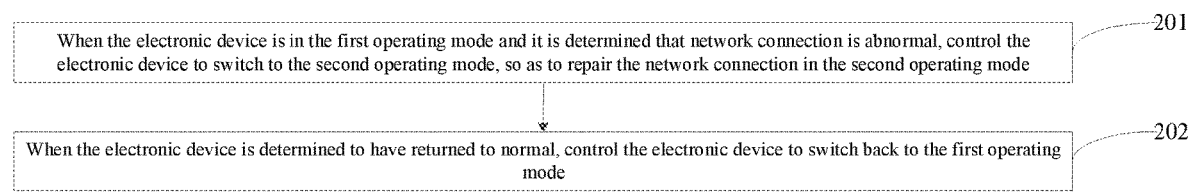
FIG. 2 is a schematic flow chart of another control method according to an embodiment of the present disclosure.

Based on the embodiments described above, the present disclosure provides a control method. As shown in FIG. 2, the method includes the following processes.

Process 201, when the electronic device is in the first operating mode and it is determined that the network connection is abnormal, controlling the electronic device to switch to the second operating mode, to repair the network connection in the second operating mode.

In one embodiment, the electronic device can also implement the following process 201a or process 201b when executing that when the electronic device is in the first operating mode and it is determined that the network connection is abnormal, controlling the electronic device to switch to the second operating mode in the process 201.

Process 201a, when it is determined that the network connection of the electronic device is abnormal based on network status monitoring data of a second application, controlling the electronic device to switch to the second operating mode through the second application.

The second application is an application that can run in the first operating mode and the second operating mode.

In some embodiments of the present disclosure, the network status monitoring data of the second application can be obtained by monitoring network card status inside the electronic device, that is, by monitoring operation data of the network card, or can be obtained by monitoring the uplink data and downlink data flow conditions of the electronic device when connected to the network.

In some embodiments of the present disclosure, when it is determined that the network connection is abnormal, the second application switches the operating mode of the electronic device from the first operating mode to the second operating mode. In one embodiment, when the first operating mode is the low power consumption mode and the second operating mode is the normal operating mode, the second application can be an application program with a wake-up function, that is, a wake-up application switches the electronic device from the low power consumption mode to the normal operating mode. The wake-up application is configured to maintain the network connection and maintain heartbeat when the electronic device is in the low power consumption mode. When there is a network problem or abnormal situation, the wake-up application wakes up the electronic device, i.e., controls the electronic device to switch to the second operating mode.

Process 201b, when it is determined that the network connection of the electronic device is abnormal based on communication volume of the electronic device within a preset time period, controlling the electronic device to switch to the second operating mode through a third application.

The third application is an application that can run in the first operating mode and the second operating mode.

In some embodiments of the present disclosure, the communication volume within the preset time period may be determined by communication data between the third application that can run in the first operating mode and its corresponding server, and further, when data flow between a specific application program, i.e., the third application, and its corresponding server does not meet a preset regulation, it is determined that the network connection is abnormal. The communication volume within the preset time period may also be determined by communication data between all applications that can run in the first operating mode and their corresponding servers, that is, when all data flow generated by all the applications inside the electronic device in the first operating mode within the preset time period does not meet a preset regulation, it is determined that the network connection is abnormal.

It should be noted that the communication volume of the electronic device within the preset time may be data volume generated by information interaction between internally running applications and the server when the electronic device is in the first operating mode, where applications and number of applications are not limited in the present disclosure.

Correspondingly, the electronic device can implement the following process 201c or process 201d when executing that repairing the network connection in the second operating mode in the process 201.

Process 201c, repairing the network connection of the electronic device in the second operating mode through the second application or the third application.

In some embodiments of the present disclosure, the application inside the electronic device that can run normally in the first operating mode and the second operating mode at the same time, i.e., the second application or the third application described above, can process the network abnormality, that is, diagnose and repair the corresponding network abnormality.

In a feasible implementation, the second application or the third application can be an application program of any operating system, or a background task of the Universal Windows Platform (UWP) in the Windows 10 operating system, which is configured to repair the network connection in the second operating mode.

It should be noted that UWP means a universal application, which can be universally used on a computer, a mobile phone, or another device, and it allows users not to design different software for different platforms.

In another embodiment, the second application or the third application may be an application such as a computer manager or an application manager.

Process 201d, repairing the network connection of the electronic device by running a fourth application.

The fourth application may be an application program of any operating system. The fourth application is an application configured to repair the network connection, and the fourth application can only run in the second operating mode.

In some embodiments of the present disclosure, the electronic device repairs the network through a specific application for repairing the network connection, i.e., the fourth application. In one embodiment, the electronic device may use the fourth application to repair the network or continuously try to connect to the network until the network is normal or the connection is normal.

Process 202, when the electronic device is determined to have returned to normal, controlling the electronic device to switch back to the first operating mode.

The power consumption and/or the available system resource of the electronic device in the first operating mode are less than the power consumption and/or the available system resource of the electronic device in the second operating mode.

In one embodiment, when the electronic device is determined to have returned to normal, and the electronic device is controlled to switch back to the first operating mode, the electronic device can implement the following process 202a or process 202b when executing the process 202.

Process 202a, when it is determined that the network connection of the electronic device is returned to normal based on the network status monitoring data or the communication volume, controlling the electronic device to switch back to the first operating mode through the second application or the third application.

In some embodiments of the present disclosure, the electronic device determines that the network connection is returned to normal when the network status monitoring data is normal or the communication volume is normal. The network status monitoring data is normal or the communication volume is normal may refer to that the network status monitoring data meets to a preset requirement or the communication volume meets a preset requirement, it may refer to that data flow of the network status monitoring data within a predetermined time period meets a preset threshold, or data flow of the communication volume within a predetermined time period meets a preset threshold.

The electronic device uses the second application or the third application to switch the operating mode, that is, the electronic device in the first operating mode is switched to the second operating mode through the second application or the third application, and meanwhile, the electronic device in the second operating mode can be switched to the first operating mode. The second application or the third application can establish a network connection with the server, and maintain the network connection, to control the electronic device to switch back to the first operating mode from a different operating mode than the first operating mode.

Process 202b, after the fourth application transfers control right of the network connection to the second application or the third application, controlling the electronic device to switch back to the first operating mode through the second application or the third application.

In some embodiments of the present disclosure, the electronic device continuously tries to repair the network and connects to the server through the fourth application in the second operating mode until the connection is normal. After the fourth application transfers the control right of the network connection to the second application or the third application, that is, the network connection is maintained by the second application or the third application, the electronic device switches back to the first operating mode from the second operating mode based on the second application or the third application, and the electronic device enters the first operating mode again. The second application or the third application continues to establish a communication link with the server for communication, and continues to maintain the network connection and maintain the heartbeat, etc. The control right of the network connection may be a management right of the network connection in the electronic device.

In one embodiment, the fourth application may be an application such as a computer manager or an application manager running in the second operating mode, which has the control right of the network connection.

It should be noted that, for the description of same processes and same content in some embodiments as those in some other embodiments, reference may be made to the description in some other embodiments, which will not be repeated herein.

In the control method provided by the embodiments of the present disclosure, the first operating mode with abnormal network connection is switched to the second operating mode, the abnormal situation is processes in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Figure 3:
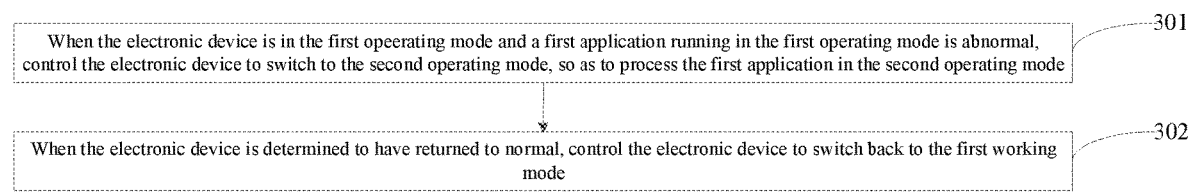
FIG. 3 is a schematic flow chart of another control method according to an embodiment of the present disclosure.

Based on the embodiments described above, the present disclosure provides a control method. As shown in FIG. 3, the method includes the following processes.

Process 301, when the electronic device is in the first operating mode and the first application running in the first operating mode is abnormal, controlling the electronic device to switch to the second operating mode, to process the first application in the second operating mode.

In one embodiment, the electronic device can implement the following process 301a, process 301b, or process 301c when executing that processing the first application in the second operating mode in the process 301.

Process 301a, in the second operating mode, diagnosing and repairing the electronic device itself through the first application.

In some embodiments of the present disclosure, the electronic device can switch the operating mode, i.e., switch from the first operating mode to the second operating mode, through the first application, and after that, the first application can diagnose and repair its own abnormal situation.

Process 301b, diagnosing and repairing the first application by running a fifth application.

The fifth application may be an application program of any operating system. The fifth application is an application that can diagnose and repair the abnormal situation of the electronic device, and the fifth application can only run in the second operating mode.

In another embodiment, the fifth application may be an application such as a computer manager or an application manager.

In some embodiments of the present disclosure, the first application can also be diagnosed and repaired through the fifth application that can run in the second operating mode and can diagnose and repair the abnormal situation. When the first operating mode is in the low power consumption state, a related repair application, such as the fifth application, is in a dormant state, and when the electronic device switches to the second operating mode, the fifth application is waked up to repair the related abnormal situation.

Process 301c, cleaning up process information of the first application through the fifth application, and creating a new first application process.

The fifth application is an application that can diagnose and repair the abnormal situation of the electronic device, and the fifth application can only run in the second operating mode.

In some embodiments of the present disclosure, when original process information of the first application is abnormal, the electronic device can also re-create a first application process to replace the original process information of the first application.

Process 302, when the electronic device is determined to have returned to normal, controlling the electronic device to switch back to the first operating mode.

The power consumption and/or the available system resource of the electronic device in the first operating mode are less than the power consumption and/or the available system resource of the electronic device in the second operating mode.

In one embodiment, when the electronic device is determined to have returned to normal, and the electronic device is controlled to switch back to the first operating mode, the electronic device can implement the following process 302a or process 302b when executing the process 302.

Process 302a, when it is determined that the first application is restored to normal, controlling the electronic device to switch back to the first operating mode through the first application.

In some embodiments of the present disclosure, after it is determined that the first application that can run in the first operating mode is repaired to normal, the electronic device switches the operating mode from the second operating mode to the first operating mode through the first application.

In another embodiment, the electronic device can also implement the following process 302b when executing the process 302: after a first application process is created, controlling the electronic device to switch back to the first operating mode through the newly created first application process.

In some embodiments of the present disclosure, the electronic device is controlled to switch from the second operating mode to the first operating mode through the updated first application, i.e., the newly created first application.

It should be noted that, for the description of same processes and same content in some embodiments as those in some other embodiments, reference may be made to the description in some other embodiments, which will not be repeated herein.

In the control method provided by the embodiments of the present disclosure, the first operating mode with abnormal first application is switched to the second operating mode, the abnormal situation is processes in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Figure 4:
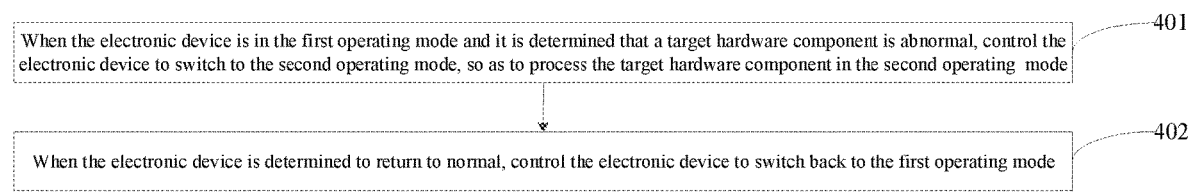
FIG. 4. is a schematic flow chart of another control method according to an embodiment of the present disclosure.

Based on the embodiments described above, the present disclosure provides a control method. As shown in FIG. 4, the method includes the following processes.

Process 401, when the electronic device is in the first operating mode and it is determined that the target hardware component is abnormal, controlling the electronic device to switch to the second operating mode, to process the target hardware component in the second operating mode.

In one embodiment, the electronic device can implement the process 401*a* when executing that when the electronic device is in the first operating mode and it is determined that the target hardware component is abnormal, controlling the electronic device to switch to the second operating mode in the process 401: when it is monitored that the usage data of the target hardware component is abnormal, controlling the electronic device to switch to the second operating mode through a sixth application.

The sixth application is an application configured to monitor operation status of the target hardware component of the electronic device, and the sixth application is an application that can run in the first operating mode and the second operating mode.

In some embodiments of the present disclosure, the sixth application may be an application program of any operating system, and the sixth application may be an application program with a monitoring function that can always run normally inside the electronic device. In one embodiment, the sixth application can monitor abnormal usage data of the network card of the electronic device, and control the electronic equipment to switch the operating mode by reporting abnormal situation. The target hardware component of the electronic device can be a firmware part such as network card, graphics card, sound card, etc. of the electronic device, and the present disclosure does not limit the target firmware part of the electronic device.

In embodiments of the present disclosure, the sixth application may be an application with data sniffing function for viewing and capturing content of network data packet, i.e., it may be a network packet analysis software, which is configured to directly communicate with the network card for data packet exchange to obtain operation status of the network. In a feasible implementation, the network card can be monitored by the network packet analysis software to determine whether the usage data of the network card is abnormal.

Process 402, when the electronic device is determined to have returned to normal, controlling the electronic device to switch back to the first operating mode.

The power consumption and/or the available system resource of the electronic device in the first operating mode are less than the power consumption and/or the available system resource of the electronic device in the second operating mode.

It should be noted that, for the description of same processes and same content in some embodiments as those in some other embodiments, reference may be made to the description in some other embodiments, which will not be repeated herein.

In the control method provided by the embodiments of the present disclosure, the first operating mode with abnormal target hardware is switched to the second operating mode, the abnormal situation is processes in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Figure 5:
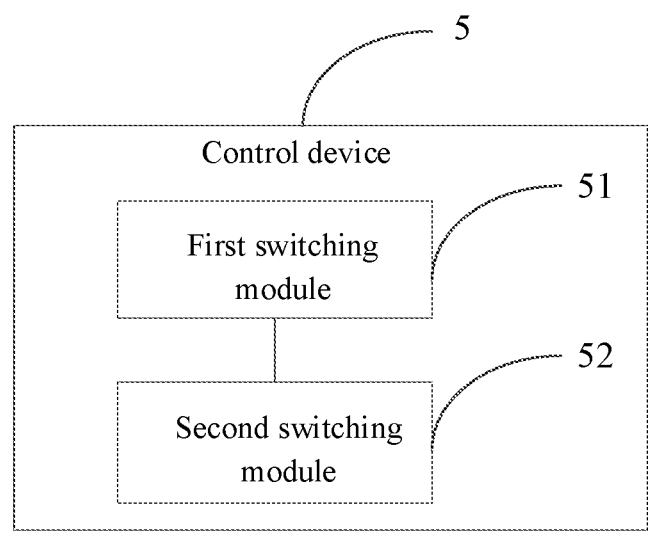
FIG. 5. is a schematic structural diagram of a control apparatus according to an embodiment of the present disclosure.

Based on the embodiments described above, the embodiments of the present disclosure also provide a control device 5, which can be applied to any control method provided by the embodiments corresponding to FIGS. 1-4. As shown in FIG. 5, the control device 5 includes: a first switching module 51 and a second switching module 52. The first switching module 51 is configured to, when the electronic device is in the first operating mode and it is determined that there is an abnormal situation, control the electronic device to switch to a second operating mode, to process the abnormal situation in the second operating mode. The second switching module 51 is configured to, when it is determined that the electronic device has returned to normal, control the electronic device to switch back to the first operating mode. The power consumption and/or the available system resource of the electronic device in the first operating mode are less than the power consumption and/or the available system resource of the electronic device in the second operating mode.

In some other embodiments of the present disclosure, the first switching module 51 is also configured to: when the electronic device is in the first operating mode and it is determined that the network connection is abnormal, control the electronic device to switch to the second operating mode, to repair the network connection in the second operating mode; or, when the electronic device is in the first operating mode and the first application running in the first operating mode is abnormal, control the electronic device to switch to the second operating mode, to process the first application in the second operating mode; or, when the electronic device is in the first operating mode and it is determined that the target hardware component is abnormal, control the electronic device to switch to the second operating mode, to process the target hardware component in the second operating mode.

In some other embodiments of the present disclosure, the first switching module 51 is also configured to: when it is determined that the network connection of the electronic device is abnormal based on the network status monitoring data of the second application, control the electronic device to switch to the second operating mode through the second application, the second application being an application that can run in the first operating mode and the second operating mode; or, when it is determined that the network connection of the electronic device is abnormal based on the communication volume of the electronic device within the preset time period, control the electronic device to switch to the second operating mode through the third application, the third application being an application that can run in the first operating mode and the second operating mode.

In some other embodiments of the present disclosure, the first switching module 51 is also configured to: repair the network connection of the electronic device in the second operating mode through the second application or the third application; or, repair the network connection of the electronic device by running the fourth application, the fourth application being an application configured to repair the network connection and can only run in the second operating mode.

In some other embodiments of the present disclosure, the second switching module 52 is also configured to: when it is determined that the network connection of the electronic device is returned to normal based on the network status monitoring data or the communication volume, control the electronic device to switch back to the first operating mode through the second application or the third application; or, after the fourth application transfers the control right of the network connection to the second application or the third application, control the electronic device to switch back to the first operating mode through the second application or the third application.

In some other embodiments of the present disclosure, the first switching module 51 is also configured to: in the second operating mode, diagnose and repair the electronic device itself through the first application; or, diagnose and repair the first application by running the fifth application, the fifth application being an application that can diagnose and repair the abnormal situation of the electronic device and can only run in the second operating mode; or, clean up the process information of the first application through the fifth application, and create a new first application process, the fifth application being an application that can diagnose and repair the abnormal situation of the electronic device and can only run in the second operating mode.

In some other embodiments of the present disclosure, the second switching module 52 is also configured to: when it is determined that the first application is restored to normal, control the electronic device to switch back to the first operating mode through the first application; or, after the first application process is created, control the electronic device to switch back to the first operating mode through the newly created first application process.

In some other embodiments of the present disclosure, the first switching module 51 is also configured to: when it is monitored that the usage data of the target hardware component is abnormal, control the electronic device to switch to the second operating mode through the sixth application, the sixth application being an application configured to monitor the operation status of the target hardware component of the electronic device and can run in the first operating mode and the second operating mode.

It should be noted that, for the specific implementation process of the processes executed by each module in the present disclosure, reference may be made to the implementation process in the control method provided by the embodiments corresponding to FIGS. 1-4, and will not be repeated herein.

In the control device provided by the embodiments of the present disclosure, the first operating mode with the abnormal situation is switched to the second operating mode, the abnormal situation is processes in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Figure 6:
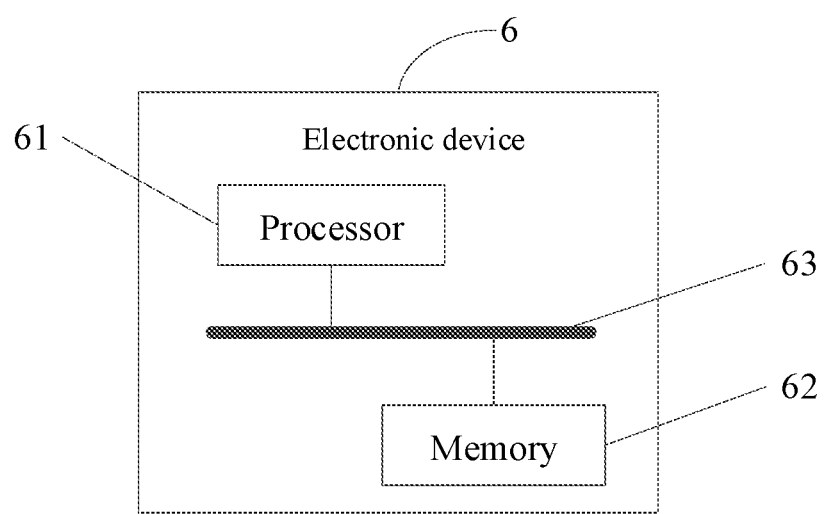
FIG. 6. is a schematic structural diagram of an electronic device according to an embodiment of the present disclosure.

Based on the embodiments described above, the embodiments of the present disclosure also provide an electronic device 6, which can be applied to any control method provided by the embodiments corresponding to FIGS. 1-4. As shown in FIG. 6, the electronic device 6 includes: a processor 61, a memory 62, and a communication bus 63, where the communication bus 63 is configured to implement a communication connection between the processor 61 and the memory 62.

The processor 61 is configured to execute a program of the control method stored in the memory 62 to implement the following processes: when the electronic device is in a first operating mode and it is determined that there is an abnormal situation, controlling the electronic device to switch to a second operating mode, to process the abnormal situation in the second operating mode; when it is determined that the electronic device has returned to normal, controlling the electronic device to switch back to the first operating mode. The power consumption and/or the available system resource of the electronic device in the first operating mode are less than the power consumption and/or the available system resource of the electronic device in the second operating mode.

In some other embodiments of the present disclosure, the processor 61 can also implement the following processes when it is configured to execute the program of the control method stored in the memory 62 that when the electronic device is in a first operating mode and it is determined that there is an abnormal situation, controlling the electronic device to switch to a second operating mode, to process the abnormal situation in the second operating mode: when the electronic device is in the first operating mode and it is determined that the network connection is abnormal, controlling the electronic device to switch to the second operating mode, to repair the network connection in the second operating mode; or, when the electronic device is in the first operating mode and the first application running in the first operating mode is abnormal, controlling the electronic device to switch to the second operating mode, to process the first application in the second operating mode; or, when the electronic device is in the first operating mode and it is determined that the target hardware component is abnormal, controlling the electronic device to switch to the second operating mode, to process the target hardware component in the second operating mode.

In some other embodiments of the present disclosure, the processor 61 can also implement the following processes when it is configured to execute the program of the control method stored in the memory 62 that when the electronic device is in the first operating mode and it is determined that the network connection is abnormal, controlling the electronic device to switch to the second operating mode: when it is determined that the network connection of the electronic device is abnormal based on the network status monitoring data of the second application, controlling the electronic device to switch to the second operating mode through the second application, the second application being an application that can run in the first operating mode and the second operating mode; or, when it is determined that the network connection of the electronic device is abnormal based on the communication volume of the electronic device within the preset time period, controlling the electronic device to switch to the second operating mode through the third application, the third application being an application that can run in the first operating mode and the second operating mode.

In some other embodiments of the present disclosure, the processor 61 can also implement the following processes when it is configured to execute the program of the control method stored in the memory 62 that repairing the network connection in the second operating mode: repairing the network connection of the electronic device in the second operating mode through the second application or the third application; or, repairing the network connection of the electronic device by running the fourth application, the fourth application being an application configured to repair the network connection and can only run in the second operating mode.

In some other embodiments of the present disclosure, the processor 61 can also implement the following processes when it is configured to execute the program of the control method stored in the memory 62 that when it is determined that the electronic device has returned to normal, controlling the electronic device to switch back to the first operating mode: when it is determined that the network connection of the electronic device is returned to normal based on the network status monitoring data or the communication volume, controlling the electronic device to switch back to the first operating mode through the second application or the third application; or, after the fourth application transfers the control right of the network connection to the second application or the third application, controlling the electronic device to switch back to the first operating mode through the second application or the third application.

In some other embodiments of the present disclosure, the processor 61 can also implement the following processes when it is configured to execute the program of the control method stored in the memory 62 that processing the first application in the second operating mode: in the second operating mode, diagnosing and repairing the electronic device itself through the first application; or, diagnosing and repairing the first application by running the fifth application, the fifth application being an application that can diagnose and repair the abnormal situation of the electronic device and can only run in the second operating mode; or, cleaning up the process information of the first application through the fifth application, and creating a new first application process, the fifth application being an application that can diagnose and repair the abnormal situation of the electronic device and can only run in the second operating mode.

In some other embodiments of the present disclosure, the processor 61 can also implement the following processes when it is configured to execute the program of the control method stored in the memory 62 that when it is determined that the electronic device has returned to normal, controlling the electronic device to switch back to the first operating mode: when it is determined that the first application is restored to normal, controlling the electronic device to switch back to the first operating mode through the first application; or, after the first application process is created, controlling the electronic device to switch back to the first operating mode through the newly created first application process.

In some other embodiments of the present disclosure, the processor 61 can also implement the following processes when it is configured to execute the program of the control method stored in the memory 62 that when the electronic device is in the first operating mode and it is determined that the target hardware component is abnormal, controlling the electronic device to switch to the second operating mode: when it is monitored that the usage data of the target hardware component is abnormal, controlling the electronic device to switch to the second operating mode through the sixth application, the sixth application being an application configured to monitor the operation status of the target hardware component of the electronic device and can run in the first operating mode and the second operating mode.

It should be noted that, for the specific implementation process of the processes executed by the processor in the present disclosure, reference may be made to the implementation process in the control method provided by the embodiments corresponding to FIGS. 1-4, and will not be repeated herein.

In the electronic device provided by the embodiments of the present disclosure, the first operating mode with the abnormal situation is switched to the second operating mode, the abnormal situation is processes in the second operating mode, and the first operating mode is switched back when it is determined that the abnormal situation returns to normal, so that the abnormal situation of the electronic device in the low power consumption state is solved, which thereby ensures normal operation of the electronic device in the low power consumption state and quick response to related events.

Based on the embodiments described above, the embodiments of the present disclosure provide a computer readable storage medium storing one or more programs, and the one or more programs can be executed by one or more processors, to implement the processes in any control method provided by the embodiments corresponding to FIGS. 1-4.

Those skilled in the art should understand that the embodiments of the present disclosure can be provided as a method, a system, or a computer program product. Therefore, the present disclosure may use the form of hardware embodiments, software embodiments, or software and hardware combined embodiments. In addition, the present disclosure may take the form of the computer program product implemented on one or more computer usable storage media (including but not limited to disk storage, optical storage, etc.) having computer usable program codes.

The present disclosure is described with reference to flow charts and/or block diagrams of the method, device (system), and computer program product according to the embodiments of the present disclosure. It should be understood that each process and/or block in the flow chart and/or block diagram, and the combination of processes and/or blocks in the flow chart and/or block diagram can be implemented by computer program instructions. These computer program instructions can be provided to a processor of a general-purpose computer, a special-purpose computer, an embedded processor, or another programmable data processing equipment, to produce a machine, so that the instructions executed by the processor of the computer or another programmable data processing equipment can be used to generate a device that realizes the functions specified in one process or multiple processes in the flow chart and/or one block or multiple blocks in the block diagram.

These computer program instructions can also be stored in a computer-readable memory that can direct the computer or another programmable data processing equipment to work in a specific manner, so that the instructions stored in the computer-readable memory produce a manufacture including the instruction device. The instruction device implements the functions specified in one process or multiple processes in the flow chart and/or one block or multiple blocks in the block diagram.

These computer program instructions can also be loaded on the computer or another programmable data processing equipment, so that a series of operation processes are executed on the computer or another programmable equipment to produce computer-implemented processing. As such, the instructions executed on the computer or another programmable equipment provide processes for implementing the functions specified in one process or multiple processes in the flow chart and/or one block or multiple blocks in the block diagram.

The above are only some embodiments of the present disclosure, and are not used to limit the protection scope of the present disclosure.

What is claimed is:

1. A control method comprising:
when an electronic device is in a first operating mode and has an abnormal situation, switching the electronic device to a second operating mode, to process the abnormal situation in the second operating mode; and
when the electronic device has returned to normal, switching the electronic device to the first operating mode;
wherein power consumption and/or available system resource of the electronic device in the first operating mode are less than power consumption and available system resource of the electronic device in the second operating mode, respectively, wherein the system resource of the electronic device includes at least one of the following: a central processing unit (CPU), a sound card, a display, an I/O interface, a network card, and an internal drivers of the electronic device, and when the electronic device is in the first operating mode and has an abnormal situation, includes:
when a network connection to the electronic device is abnormal, switching the electronic device to the second operating mode, to repair the network connection in the second operating mode; or
when a first application of the electronic device is running in the first operating mode is abnormal, switching the electronic device to the second operating mode, to process the first application in the second operating mode;
when the electronic device is in the first operating mode and a target hardware component is abnormal, switching the electronic device to the second operating mode, to process the target hardware component in the second operating mode.

2. The method of claim 1, wherein switching the electronic device to the second operating mode, when the electronic device is in the first operating mode and the network connection is abnormal, includes:
when the network connection of the electronic device is abnormal according to network status monitoring data of a second application, switching the electronic device to the second operating mode through the second application, the second application being configured to operate in the first operating mode and the second operating mode; or
when the network connection of the electronic device is abnormal according to communication volume of the electronic device within a preset time period, switching the electronic device to the second operating mode through a third application, the third application being configured to operate in the first operating mode and the second operating mode.

3. The method of claim 2, wherein repairing the network connection in the second operating mode includes:
repairing the network connection of the electronic device in the second operating mode through the second application or the third application; or
repairing the network connection of the electronic device by running a fourth application, the fourth application being an application configured to repair the network connection and can only run in the second operating mode.

4. The method of claim 3, wherein switching the electronic device back to the first operating mode, when the electronic device has returned to normal, includes:
when the network connection of the electronic device is returned to normal based on the network status monitoring data or the communication volume, switching the electronic device back to the first operating mode through the second application or the third application; or
after the fourth application transfers control right of the network connection to the second application or the third application, switching the electronic device to the first operating mode through the second application or the third application.

5. The method of claim 1, wherein processing the first application in the second operating mode includes:
in the second operating mode, diagnosing and repairing the electronic device through the first application; or
diagnosing and repairing the first application by running a fifth application, the fifth application being configured to diagnose and repair the abnormal situation of the electronic device and to only run in the second operating mode; or
cleaning up process information of the first application through the fifth application, and creating a new first application process, the fifth application being configured to diagnose and repair the abnormal situation of the electronic device and to only run in the second operating mode.

6. The method of claim 5, wherein switching the electronic device back to the first operating mode, when the electronic device has returned to normal, includes:
when the first application is restored to normal, switching the electronic device back to the first operating mode through the first application; or
after a first application process is created, switching the electronic device back to the first operating mode through the newly created first application process.

7. The method of claim 1, wherein switching the electronic device to the second operating mode, when the electronic device is in the first operating mode and the target hardware component is abnormal, includes:
when it is monitored that usage data of the target hardware component is abnormal, switching the electronic device to the second operating mode through a sixth application, the sixth application being an application configured to monitor operation status of the target hardware component of the electronic device and to run in the first operating mode and the second operating mode.

8. A control device comprising:
a first switching module configured to, when an electronic device is in a first operating mode and has an abnormal situation, switch the electronic device to a second operating mode, to process the abnormal situation in the second operating mode; and
a second switching module configured to, when the electronic device has returned to normal, switch the electronic device back to the first operating mode;
wherein power consumption and available system resource of the electronic device in the first operating mode are less than power consumption and available system resource of the electronic device in the second operating mode, respectively, wherein the system resource of the electronic device includes at least one of the following: a central processing unit (CPU), a sound card, a display, an I/O interface, a network card, and an internal drivers of the electronic device, and when the electronic device is in the first operating mode and has an abnormal situation, includes:

when a network connection to the electronic device is abnormal, switching the electronic device to the second operating mode, to repair the network connection in the second operating mode; or when a first application of the electronic device is running in the first operating mode is abnormal, switching the electronic device to the second operating mode, to process the first application in the second operating mode; or when a target hardware component of the electronic device is abnormal, switching the electronic device to the second operating mode, to process the target hardware component in the second operating mode.

9. An electronic device comprising:
a memory;
a processor configured to execute a program of a control method stored in the memory to implement a control method comprising:
when the electronic device is in a first operating mode and has an abnormal situation, switching the electronic device to a second operating mode, to process the abnormal situation in the second operating mode; and
when the electronic device has returned to normal, switching the electronic device back to the first operating mode;
wherein power consumption and/or available system resource of the electronic device in the first operating mode are less than power consumption and/or available system resource of the electronic device in the second operating mode; and
a communication bus configured to implement a communication connection between the processor and the memory, respectively, wherein the system resource of the electronic device includes at least one of the following: a central processing unit (CPU), a sound card, a display, an I/O interface, a network card, and an internal drivers of the electronic device, and wherein when the electronic device is in the first operating mode and has an abnormal situation, includes:
when a network connection to the electronic device is abnormal, switching the electronic device to the second operating mode, to repair the network connection in the second operating mode; or
when a first application of the electronic device is running in the first operating mode is abnormal, switching the electronic device to the second operating mode, to process the first application in the second operating mode; or
when a target hardware component of the electronic device is abnormal, switching the electronic device to the second operating mode, to process the target hardware component in the second operating mode.

10. The electronic device of claim 9, wherein switching the electronic device to the second operating mode, when the electronic device is in the first operating mode and the network connection is abnormal, includes:
when the network connection of the electronic device is abnormal according to network status monitoring data of a second application, switching the electronic device to the second operating mode through the second application, the second application being configured to operate in the first operating mode and the second operating mode; or
when the network connection of the electronic device is abnormal according to communication volume of the electronic device within a preset time period, switching the electronic device to the second operating mode through a third application, the third application being configured to operate in the first operating mode and the second operating mode.

11. The electronic device of claim 10, wherein repairing the network connection in the second operating mode includes:
repairing the network connection of the electronic device in the second operating mode through the second application or the third application; or
repairing the network connection of the electronic device by running a fourth application, the fourth application being an application configured to repair the network connection and can only run in the second operating mode.

12. The electronic device of claim 11, wherein switching the electronic device back to the first operating mode, when the electronic device has returned to normal, includes:
when the network connection of the electronic device has returned to normal based on the network status monitoring data or the communication volume, switching the electronic device back to the first operating mode through the second application or the third application; or
after the fourth application transfers control right of the network connection to the second application or the third application, switching the electronic device to the first operating mode through the second application or the third application.

13. The electronic device of claim 9, wherein processing the first application in the second operating mode includes:
in the second operating mode, diagnosing and repairing the electronic device through the first application; or
diagnosing and repairing the first application by running a fifth application, the fifth application being configured to diagnose and repair the abnormal situation of the electronic device and to only run in the second operating mode; or
cleaning up process information of the first application through the fifth application, and creating a new first application process, the fifth application being configured to diagnose and repair the abnormal situation of the electronic device and to only run in the second operating mode.

14. The electronic device of claim 13, wherein switching the electronic device back to the first operating mode, when the electronic device has returned to normal, includes:
when the first application is restored to normal, switching the electronic device back to the first operating mode through the first application; or
after a first application process is created, switching the electronic device back to the first operating mode through the newly created first application process.

15. The electronic device of claim 9, wherein switching the electronic device to the second operating mode, when the electronic device is in the first operating mode and the target hardware component is abnormal, includes:
when it is monitored that usage data of the target hardware component is abnormal, switching the electronic device to the second operating mode through a sixth application, the sixth application being an application configured to monitor operation status of the target hardware component of the electronic device and to run in the first operating mode and the second operating mode.

* * * * *